Figure 3:
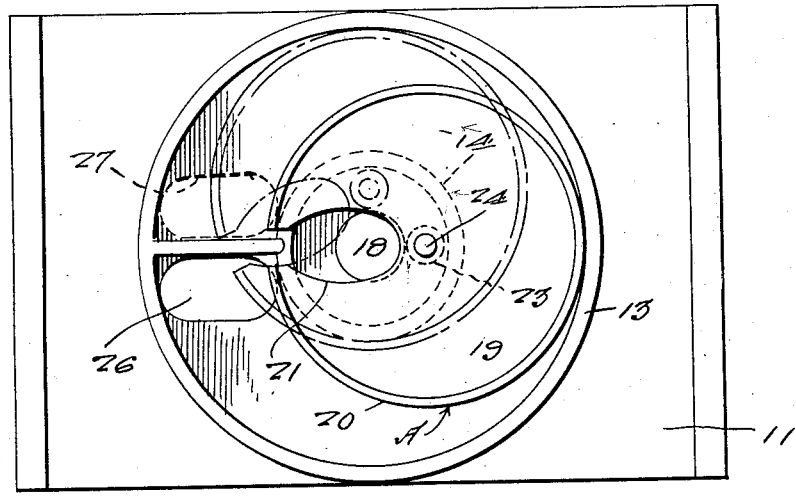

March 27, 1928. 1,663,933
F. J. BENDER
MILK METER
Filed Sept. 14, 1925 3 Sheets-Sheet 1

Inventor
F. J. Bender

March 27, 1928.
F. J. BENDER
MILK METER
Filed Sept. 14, 1925  3 Sheets-Sheet 2
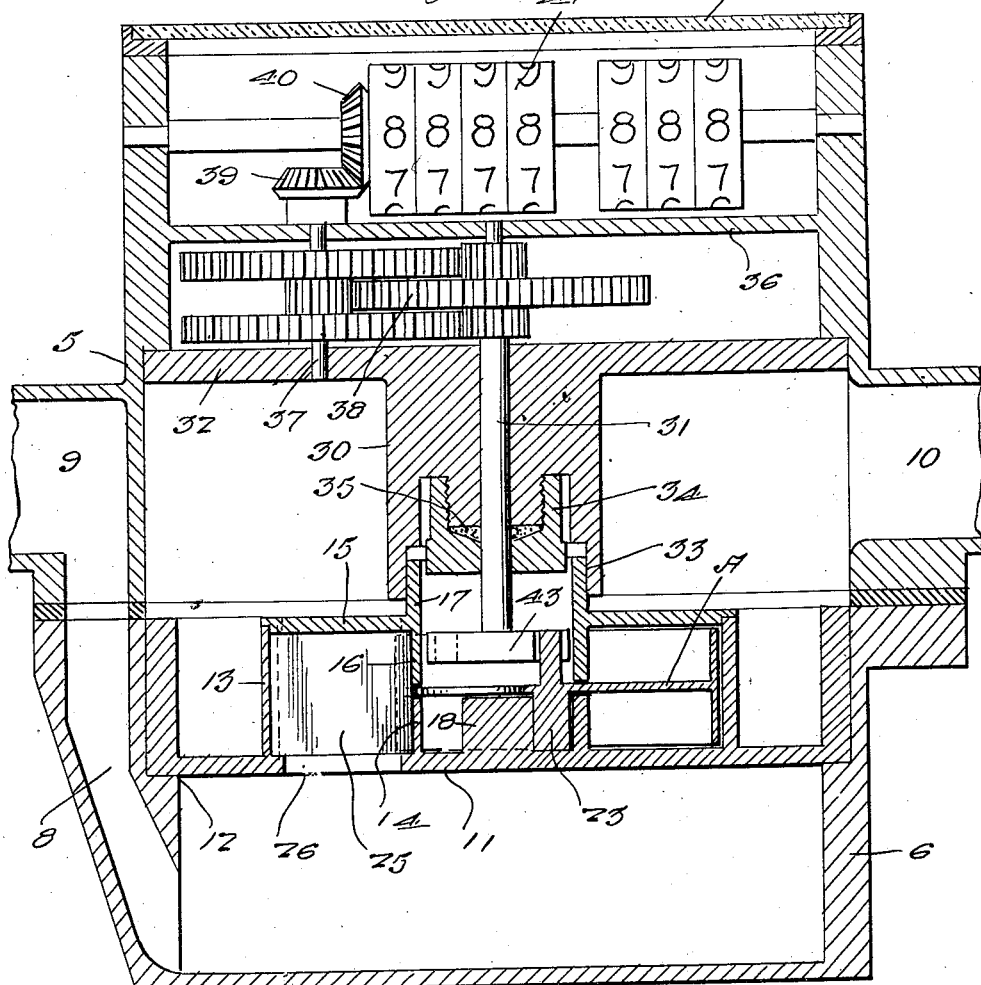
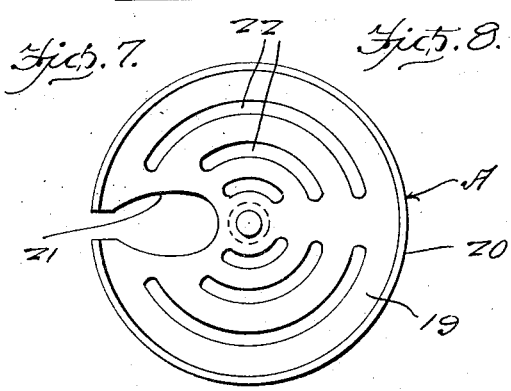
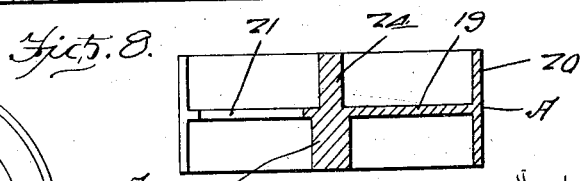
Inventor
F. J. Bender
By Clarence A. O'Brien
Attorney March 27, 1928. 1,663,933
F. J. BENDER
MILK METER
Filed Sept. 14, 1925   3 Sheets-Sheet 3

Inventor
F. J. Bender
By Clarence A. O'Brien
Attorney

Patented Mar. 27, 1928.

1,663,933

UNITED STATES PATENT OFFICE.

FRANK J. BENDER, OF FOREST PARK, ILLINOIS, ASSIGNOR OF ONE-EIGHTH PER CENT TO JOHN C. WEIRSERT AND ONE-EIGHTH PER CENT TO JOHN HOLLERBACH, BOTH OF FOREST PARK, ILLINOIS, AND ONE-EIGHTH PER CENT TO LEO STIEGART, OF RIVER FOREST, ILLINOIS.

MILK METER.

Application filed September 14, 1925. Serial No. 56,409.

The present invention relates to a milk meter which is adapted to be utilized in a pipe line for milk such as is used around dairies and the like for measuring the amount of milk passing therethrough.

An important object of the invention is to provide a meter of this nature wherein the propelling unit is capable of being easily and quickly assembled or disassembled for cleaning purposes.

Another important object of the invention is to provide a highly novel propelling unit in a meter which possesses a revolving motion and an oscillatory motion about its own axis.

Another important object of the invention is to provide an improved propelling unit in a milk meter which is simple in its construction, durable, thoroughly reliable and efficient in operation, not likely easy to become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
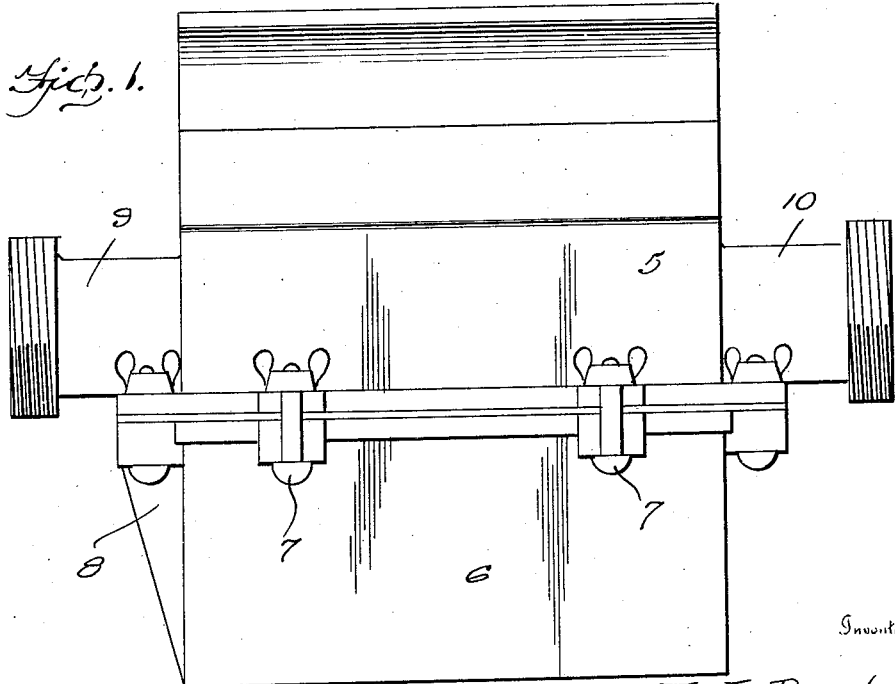
Figure 4:
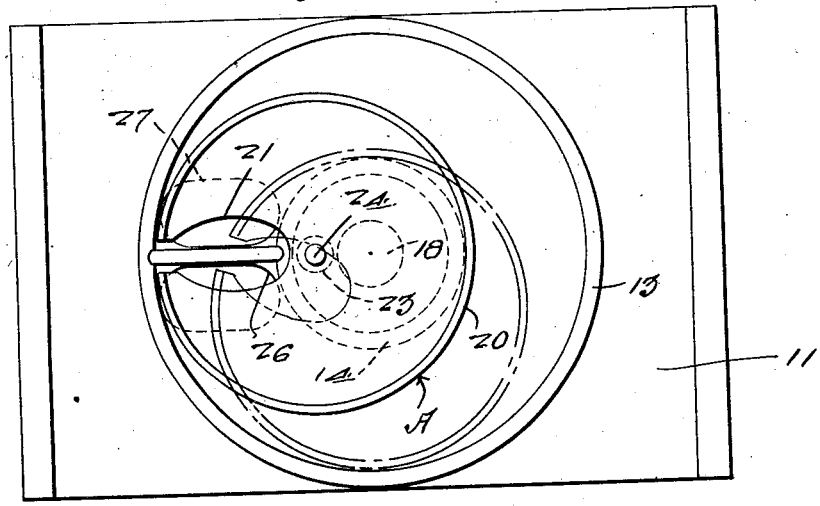
Figure 5:
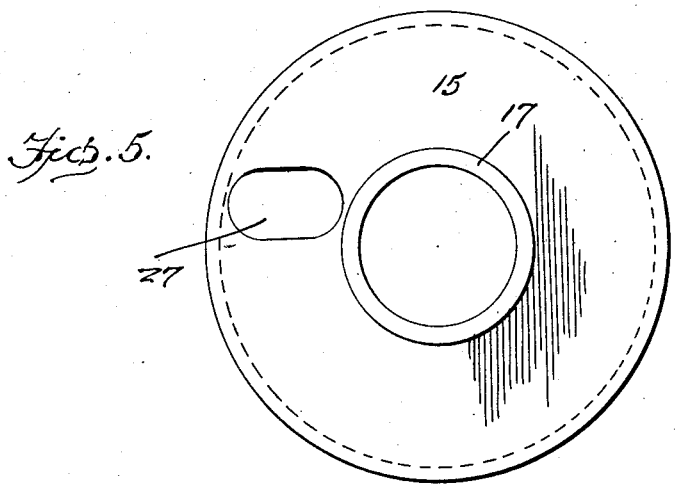
Figure 6:
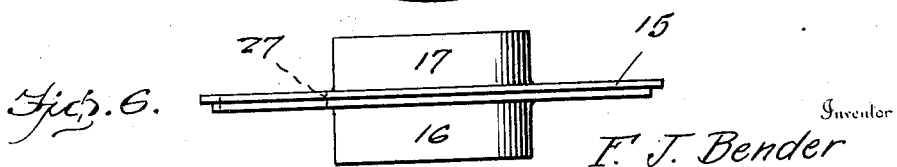

In the drawing,

Figure 1 is a side elevation of the milk meter embodying the features of my invention, Fig. 2 is a vertical longitudinal section therethrough, Fig. 3 is a top plan view of the propelling unit with the cover plates removed showing the propeller in different positions, Fig. 4 is a similar view showing the propeller in still further different positions, Fig. 5 is a plan view of the cover for the propelling unit, Fig. 6 is a side elevation thereof, Fig. 7 is a plan view of the propeller, and Fig. 8 is a sectional view thereof.

Referring to the drawing in detail, it will be seen that numeral 5 designates the casing which is mounted on the base 6 by means of bolts 7 or in any other suitable detachable manner. The base 6 is of a hollow construction and has a conduit 8 leading to the interior thereof from the inlet 9 which is formed integral with the casing 5. An outlet 10 is oppositely disposed from the inlet 9 and communicates with the interior of the casing as will be apparent from an inspection of Fig. 2.

The propelling unit includes a shell formed by the shelf or bottom 11 resting on shoulders 12 interiorly of the base 6, an outer circular wall 13, an inner circular wall 14 concentrically disposed in relation to the outer wall and shorter in height than the outer wall, a cover 15 having a depending circular wall 16 concentric with the wall 14 and an upwardly extending circular wall 17.

A lug 18 rises from the center of the bottom 11 and is disposed centrally of the wall 14 so as to form a circular path thereabout.

A propeller A is mounted in the shell. Referring specifically to this propeller as illustrated to advantage in Figs. 7 and 8, it will be seen that 19 designates a circular plate having a rim 20 disposed thereabout. The plate and rim 20 are provided with the radially extending slot 21. The plate 19 is provided with arcuate slots 22 disposed concentrically about the center of the plate. A pin 23 depends from the center of the plate 19 and a pin 24 rises from the center of the plate 19. The pin 23 is adapted to move in the circular path provided by the wall 14 about the lug 18. The plate 19 is adapted to move between the upper edge of the wall 14 and the lower edge of the wall 16 as is apparent from an inspection of Fig. 2.

The rim 20 is adapted to move within the space between walls 14 and 16 and wall 13. A partition 25 is disposed between walls 14 and 16 and wall 13 and extends radially. This partition further extends between the bottom 11 and the cover 15. The partition also extends into the slot 21 of the propeller A. An opening 26 is provided in the bottom 11 to one side of the partition 25, and an opening 27 is provided in the cover 15 to the other side of the partition 25. The milk enters through the inlet 9 and proceeds downwardly through the conduit 8 into the hollow base 6, filling the interior thereof so that the milk rises through the opening 26. Presuming that the propeller is situated in the full line position shown in Fig. 3, it will be seen that the milk collects in the space between one-half of the rim 20 and approximately one-half of the wall 13 thereby tending to move the propeller to the dotted line position shown in Fig. 3, at which time the pin 23 has moved through an arc of 90° about the lug 18, and the rim and plate 20 and 19 respectively have slightly oscillated about the axis of the pin because of the engagement of the partition in the slot 21. The space just mentioned has enlarged and has a tendency to continue to enlarge as the milk further flows thereinto, thereby forcing the propeller to the full line position shown in Fig. 4. When in this position, the pin 23 has moved through an arc of 180° from its initial position about the lug 18. When in this position, the milk flows inside of the rim, thru the slots 22, and out the opening 27, the slot 22 being provided for the purpose of allowing the liquid to pass into the space above the plate so that the capacity of the inner chamber will be substantially equal to that of the outer chamber.

When in the full line position shown in Fig. 4, the movement of the milk as described tends to move the propeller to the dotted line position shown in the same figure at which time the pin 23 has progressed to 270° from its initial position about the lug 18. From this position, the propeller will be returned to its initial position as will be obvious.

A housing 30 for shaft 31 depends from the plate 32 which shuts off the upper portion of the casing from the lower portion. The housing 30 is recessed at its bottom end for receiving the wall 17 and a packing nut 34 is engaged on the housing within the recess for holding the packing 35 about the shaft 31. A partition 36 is disposed in the casing above the plate 32 and the upper end of the shaft 31 is journaled therein.

A shaft 37 is journaled in the partition 36 and the plate 32 and suitable gearing 38 operatively connects the shafts 31 and 37. Above the partition 36 there is fixed on the shaft 37 a beveled gear 39 meshing with another beveled gear 40 operatively associated with the counter mechanism 41 which is of any conventional formation. A transparent panel 42 is provided at the top of the casing in order that the counting mechanism may be read.

On the lower end of the shaft 31 there is mounted a cross head or crank 43 engageable by the pin 24, so that when the propeller A moves as heretofore described, this pin which moves in a circular orbit will turn the crank 43 to impart rotary motion to the shaft 31. This rotary motion of the shaft 31 imparts rotary motion to the shaft 37 through the intermediacy of the gearing 38 and thus the counting mechanism 41 is operated through the gears 39 and 40.

It will be seen that this device is capable of being placed in a pipe line through which milk flows for the purpose of measuring the milk. The invention, however, is in no way limited to this particular use and may be adapted to measure any flowing liquid.

The present embodiment of the invention has been disclosed merely by way of example since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

In a milk meter, a shell formed with an inlet and an outlet, shoulders formed in the shell, a casing having inner and outer concentric circular walls and top and bottom walls, said bottom wall projecting beyond the outer circular wall and resting on the shoulders to dispose the casing between the inlet and the outlet, a partition disposed radially between the circular walls and between the top and bottom walls, said casing having an opening in its top to one side of the partition and another opening in its bottom to the other side of the partition, a propeller including a circular plate having a radially disposed slot extending inwardly from its edge, a rim about the outer edge and having a slot at the slot of the plate, said inner circular wall being formed in top and bottom sections disposed in spaced relation to accommodate said plate therebetween, said plate being provided with slots to allow liquid to pass into the space above the plate, a lug rising from the bottom of the casing centrally of the inner wall, a pin projecting downwardly and centrally from the plate to move in a circular orbit about the lug within the inner wall, said rim being of such length as to engage said top and bottom walls to form therewith and with the concentric circular walls a measuring chamber, said partition extending into the slot of the plate and the rim, a second pin projecting upwardly from the center of the plate, a shaft, a crank on the shaft engaged by the second pin, and a counter mechanism operatively connected with the shaft.

In testimony whereof I affix my signature.

FRANK J. BENDER.